(12) United States Patent
Creekbaum et al.

(10) Patent No.: US 9,396,282 B2
(45) Date of Patent: *Jul. 19, 2016

(54) SYSTEM, METHOD, AND SOFTWARE APPLICATION FOR DISPLAYING DATA FROM A WEB SERVICE IN A VISUAL MAP

(71) Applicant: Mindjet LLC, San Francisco, CA (US)

(72) Inventors: William J. Creekbaum, San Mateo, CA (US); Michael B. Jetter, Corte Madera, CA (US); Steven Bashford, Johannesberg (DE)

(73) Assignee: Mindjet LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,856

(22) Filed: Jun. 1, 2015

(65) Prior Publication Data

US 2015/0261879 A1    Sep. 17, 2015

Related U.S. Application Data

(63) Continuation of application No. 12/291,495, filed on Nov. 10, 2008, now Pat. No. 9,047,388, which is a continuation-in-part of application No. 10/882,556, filed on Jul. 1, 2004, now Pat. No. 9,038,001.

(51) Int. Cl.
*G06F 17/00* (2006.01)
*G06F 17/30* (2006.01)
(Continued)

(52) U.S. Cl.
CPC ........ *G06F 17/30905* (2013.01); *G06F 17/212* (2013.01); *G06F 17/227* (2013.01); *G06F 17/2247* (2013.01); *G06F 17/24* (2013.01); *G06F 17/30716* (2013.01)

(58) Field of Classification Search
CPC ... G06F 3/0482; G06F 17/211; G06F 17/212; G06F 17/2247; G06F 17/30905; G06F 17/30716; G06F 17/24
See application file for complete search history.

(56) References Cited

U.S. PATENT DOCUMENTS 5,257,185 A   10/1993   Farley et al.
5,327,529 A   7/1994    Fults et al.
(Continued)

FOREIGN PATENT DOCUMENTS

EP    0784263      7/1997
WO    03014965     2/2003
WO    2009075867   6/2009

OTHER PUBLICATIONS

Librelotto et al., Extreme Markup Languages 2007, Montreal, Quebec, Aug. 7-10, 2007, pp. 1-15.
(Continued)

*Primary Examiner* — Scott Baderman
*Assistant Examiner* — Howard Cortes
(74) *Attorney, Agent, or Firm* — Lessani Law Group, PC (57) ABSTRACT

The present invention provides a system, method, and software application for enabling a user to view data from an external data source in a visual map, wherein the external data source has a web services interface. Visual mapping software on a computer provides a visual mapping interface in which a user can create, edit, and/or view a visual map. Within the visual mapping interface, the visual mapping software provides the user with an option to obtain data from one or more data sources associated with a web service. In response to the user selecting a data source associated with a web service, the visual mapping software builds a web service request for the web service associated with the selected data source. The visual mapping application makes a call to the applicable web service with the web service request. The visual mapping application subsequently receives data from the web service and transforms the data into a format that can be used to generate visual map data. The visual mapping software then displays the data in a visual map.

26 Claims, 8 Drawing Sheets

(51) Int. Cl.
*G06F 17/21* (2006.01)
*G06F 17/22* (2006.01)
*G06F 17/24* (2006.01)

(56) References Cited

U.S. PATENT DOCUMENTS

| | | | |
|---|---|---|---|
| 5,341,223 A | 8/1994 | Shigeeda et al. |
| 5,546,529 A | 8/1996 | Bowers et al. |
| 5,548,749 A | 8/1996 | Kroenke et al. |
| 5,555,357 A | 9/1996 | Fernandes et al. |
| 5,597,312 A | 1/1997 | Bloom et al. |
| 5,619,694 A | 4/1997 | Shimazu |
| 5,627,979 A | 5/1997 | Chang et al. |
| 5,787,417 A | 7/1998 | Hargrove |
| 5,922,054 A | 7/1999 | Bibayan |
| 5,948,040 A | 9/1999 | DeLorme et al. |
| 5,956,708 A | 9/1999 | Dyko et al. |
| 5,966,123 A | 10/1999 | Kaplan |
| 6,037,944 A | 3/2000 | Hugh |
| 6,121,971 A | 9/2000 | Berry et al. |
| 6,148,311 A | 11/2000 | Wishnie et al. |
| 6,175,830 B1 | 1/2001 | Maynard |
| 6,182,065 B1 | 1/2001 | Yeomans |
| 6,191,786 B1 | 2/2001 | Eyzaguirre et al. |
| 6,212,526 B1 | 4/2001 | Chaudhuri et al. |
| 6,377,287 B1 | 4/2002 | Hao et al. |
| 6,405,225 B1 | 6/2002 | Apfel et al. |
| 6,411,961 B1 | 6/2002 | Chen |
| 6,418,426 B1 | 7/2002 | Schlesinger |
| 6,434,556 B1 | 8/2002 | Levin et al. |
| 6,496,208 B1 | 12/2002 | Bernhardt et al. |
| 6,507,848 B1 | 1/2003 | Crosby et al. |
| 6,628,312 B1 | 9/2003 | Rao et al. |
| 6,738,964 B1 | 5/2004 | Zink et al. |
| 6,813,531 B2 | 11/2004 | Coale et al. |
| 6,961,910 B2 | 11/2005 | Lee et al. |
| 7,080,092 B2 | 7/2006 | Upton |
| 7,168,035 B1 | 1/2007 | Bell et al. |
| 7,181,438 B1 | 2/2007 | Szabo |
| 7,203,667 B2 | 4/2007 | Higgins et al. |
| 7,313,766 B2 | 12/2007 | Kautto Kiovula et al. |
| 7,415,672 B1 | 8/2008 | Fortini et al. |
| 7,447,688 B2 | 11/2008 | Dietz et al. |
| 7,543,299 B2 | 6/2009 | Goodman et al. |
| 7,627,828 B1 | 12/2009 | Collison et al. |
| 7,694,272 B2 | 4/2010 | Bronicki et al. |
| 7,770,180 B2 | 8/2010 | Villaron et al. |
| 7,849,090 B2 | 12/2010 | Sweeney |
| 7,962,433 B1 | 6/2011 | Heidenreich et al. |
| 8,141,002 B2 | 3/2012 | Moses et al. |
| 8,145,537 B2 | 3/2012 | Wehmann |
| 9,038,001 B2 | 5/2015 | Jetter et al. |
| 9,047,388 B2 | 6/2015 | Creekbaum et al. |
| 2002/0030703 A1 | 3/2002 | Robertson et al. |
| 2002/0049689 A1 | 4/2002 | Venkatram |
| 2002/0049750 A1 | 4/2002 | Venkatram |
| 2002/0076025 A1 | 6/2002 | Liversidge et al. |
| 2002/0186238 A1 | 12/2002 | Sylor et al. |
| 2003/0004746 A1 | 1/2003 | Kheirolomoom et al. |
| 2003/0033274 A1 | 2/2003 | Chow et al. |
| 2003/0065650 A1 | 4/2003 | Annand et al. |
| 2003/0083922 A1 | 5/2003 | Reed |
| 2003/0110253 A1 | 6/2003 | Anuszczyk et al. |
| 2003/0128239 A1 | 7/2003 | Angal et al. |
| 2003/0137536 A1 | 7/2003 | Hugh |
| 2003/0149681 A1 | 8/2003 | Frees et al. |
| 2003/0154191 A1 | 8/2003 | Fish et al. |
| 2003/0204487 A1 | 10/2003 | Sssv et al. |
| 2003/0218640 A1 | 11/2003 | Noble-Thomas |
| 2003/0233631 A1 | 12/2003 | Curry et al. |
| 2003/0234808 A1 | 12/2003 | Huang et al. |
| 2003/0237046 A1 | 12/2003 | Parker et al. |
| 2004/0003033 A1 | 1/2004 | Kamen et al. |
| 2004/0030741 A1 | 2/2004 | Wolton et al. |
| 2004/0034706 A1 | 2/2004 | Cohen et al. |
| 2004/0093328 A1 | 5/2004 | Damle |
| 2004/0103071 A1 | 5/2004 | Kalia et al. |
| 2004/0193588 A1 | 9/2004 | Tago et al. |
| 2004/0219493 A1 | 11/2004 | Phillips |
| 2004/0236625 A1 | 11/2004 | Kearon |
| 2004/0254939 A1 | 12/2004 | Dettinger et al. |
| 2004/0267753 A1 | 12/2004 | Hoche |
| 2005/0038867 A1 | 2/2005 | Henderson et al. |
| 2005/0054381 A1 | 3/2005 | Lee et al. |
| 2005/0132305 A1 | 6/2005 | Guichard et al. |
| 2005/0138160 A1 | 6/2005 | Klein et al. |
| 2005/0147950 A1 | 7/2005 | Ortiz et al. |
| 2005/0171746 A1 | 8/2005 | Thalhammer-Reyero |
| 2006/0004845 A1 | 1/2006 | Kristiansen et al. |
| 2006/0005164 A1 | 1/2006 | Jetter et al. |
| 2006/0059135 A1 | 3/2006 | Palmon et al. |
| 2006/0059143 A1 | 3/2006 | Palmon et al. |
| 2006/0095474 A1 | 5/2006 | Mitra et al. |
| 2006/0184886 A1 | 8/2006 | Chung et al. |
| 2006/0285152 A1 | 12/2006 | Skillen |
| 2007/0106974 A1 | 5/2007 | Chafe et al. |
| 2007/0239680 A1 | 10/2007 | Oztekin et al. |
| 2007/0266040 A1 | 11/2007 | Figlin |
| 2008/0001948 A1 | 1/2008 | Hirsch |
| 2008/0127169 A1 | 5/2008 | Malasky et al. |
| 2008/0208885 A1 | 8/2008 | Barber et al. |
| 2009/0119572 A1 | 5/2009 | Koivunen |

OTHER PUBLICATIONS

Lu, Yiling, Roadmap for tool support for collaborative ontology engineering, University of Victoria, 2003, pp. 1-119.

"Mindjet MindManager 6 User's Guide" [Online] 2005, XP-002481935. Retrieved from the Internet: URL: http://www.mindjet.com/pdf-eng/MindManager_6_Help_Guide.pdf, pp. 4, 177-180.

Spanger, S., et al., "Mindmap: Utilizing Multiple Taxonomies and Visualization to Understand a Document Collection," Proceedings of the 35th Annual Hawaii International, 2001.

MindManager 2002 HelpFile, Mindjet LLC 2002, pp. 1, 9-12, 17, 22-23, 26, 35, 41, 46-47, 57, 61-66, 75-78, 82-84, 91, 105, 152, 157, 166, 178, 180-183, and 190, from URL: http://www.mindjet.com/pdf_eng/MM2002_Help_File_pdf.

Sumner, T., et al., "A Web Service Interface for Creating Concept Browsing Interfaces" D-Lib Magazine, Nov. 2004 vol. 10, No. 11, Nov. 2004, XP002580529 ISSN: 1082-9873.

"ThinkGraph: Introduction", Feb. 4, 2007. URL: http://www.thinkgraph.com.

Dokumentation zum Lernprogramm Mindmapping mit Freemind, Dec. 1, 2007, p. 63. URL: http://www.portal.schule.bremen.de/dokumente/loadzip/65760_v_0/projects/doc/lernmaterialfreemind.pdf.

Jelinek, Jodef, et al., "XML Visualization Using Tree Rewriting," Proceedings of the 20th Spring Conference on Computer Graphics, Apr. 22, 2004, Slovakia, XP002444098.

Delahousse, J., "Index and knowledge drawing: a natural bridge from Topic Maps to XML SVG", in Proceedings of XML USA 2001, Orlando, Dec. 2001.

Kolas, L., "Topics Maps in E-Learning: An Ontology Ensuring an Active Student Role as Producer", Proceedings of World Conference on E-Learning in Corporate, Government, Healthcare, and Higher Education 2006, pp. 2107-2113.

Drechsel, Uwe, "VYM—View Your Mind (Version 1.12.0)" Internet Citation Jun. 23, 2008, p. 35 pp.

Leissler, Martin, et al., "Automatic Updates of Interactive Information Visualization User Interfaces Supporting Multimedia Information Retrieval through Database Triggers", May 10, 2000, pp. 1-11.

Curbera, F., et al., "Unraveling the Web Services Web: An Introduction to SOAP, WSDL, and UDDI", IEEE Internet Computing, IEEE Service Center, New York, NY, vol. 6, No. 2, Mar. 2002, pp. 86-93.

Videos Retrieved from YouTube, http://www.youtube.com/watch?v=Qkd5TDRcQS4, pp. 1-3, Jan. 2015.

SYSTEM, METHOD, AND SOFTWARE APPLICATION FOR DISPLAYING DATA FROM A WEB SERVICE IN A VISUAL MAP

RELATED APPLICATIONS

This application is a continuation of U.S. patent application Ser. No. 12/291,495, titled "System, Method, and Software Application for Displaying Data from a Web Service in a Visual Map," and filed on Nov. 10, 2008, which is a continuation-in-part of U.S. patent application Ser. No. 10/882,556 titled "System and Method for Graphically Illustrating External Data Source Information in the Form of a Visual Hierarchy in an Electronic Workspace," which was filed on Jul. 1, 2004. All of the foregoing parent applications are incorporated by reference as if fully disclosed herein.

BACKGROUND OF THE INVENTION

1. Field of the Invention

This invention relates generally to visual mapping systems, and, more particularly, to displaying data from a web service in a visual map.

2. Description of the Background Art

Visual maps, such as mind maps and topic maps, provide an excellent way for users to view large amounts information in an organized, graphical format. A visual map is a diagram that represents ideas and/or information in topics. Examples of visual maps are mind maps, topic maps, semantic networks, and concept maps. Visual maps are increasingly used to help people generate, classify, and/or organize ideas and information and to see such ideas and information in a hierarchical, visual layout. Visual maps are used for project management, work-flow analysis, organizational charts, and other purposes.

Figure 1:
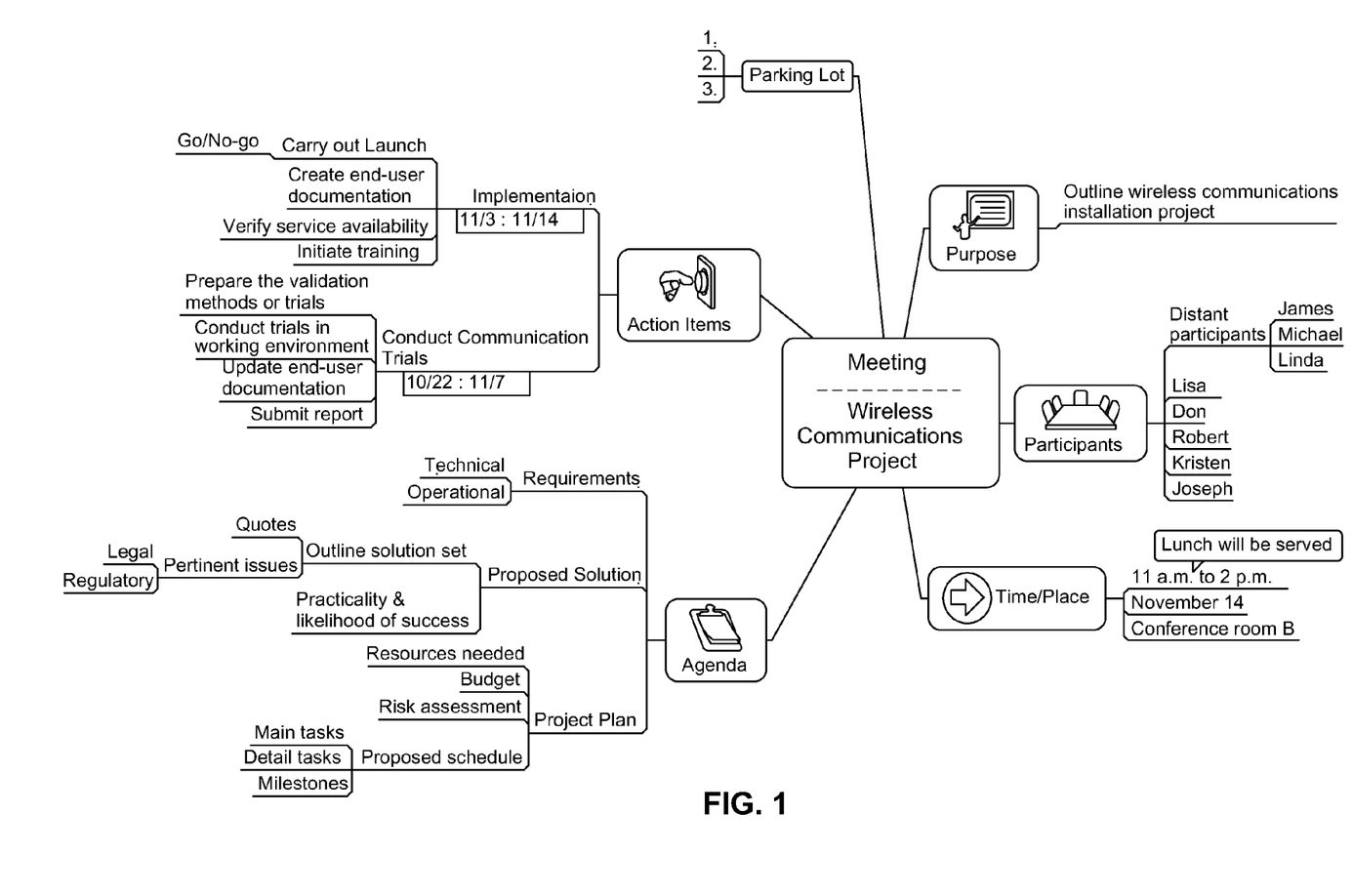
FIG. 1 is an example of a mind map.

FIG. 1 is an example of a visual map for information related to a wireless communication project meeting. The visual map in FIG. 1 is a mind map. Mind maps are made up of hierarchically-arranged topics. The main topics in FIG. 1 are "Action Items", "Purpose", "Agenda", "Time Place", "Participants", and "Purpose." Each of these topics has subtopics. For instance, "Implementation" is a subtopic for "Action Items," and "Carry out Launch" is a subtopic of "Implementation." Users typically create topics in a visual map by inserting or importing text and graphic elements into topics.

Users typically create visual maps using proprietary visual mapping software. Mindjet LLC's MINDMANGER® and MINDJET CONNECT are examples of such software.

The Internet and the World Wide Web (the "Web") have made a wealth of information available to Internet users. Many companies and other entities have made data available via Web Services ("web services"). Web services are a web-based interface to a data source. A computer can make a call to a web service based on the web service's published API (application programming interface). For example, a company with a CRM system may have a web-service interface to the CRM system. This means that the CRM data can be obtained by a program that makes a call to the web service associated with the CRM system.

It would be desirable to enable a user to view web service data within a visual map. Therefore, there is a need for a visual map interface from which a user can initiate a web service call.

SUMMARY

The present invention provides a system, method, and software application for enabling a user to view data from an external data source in a visual map, wherein the external data source has a web services interface. A web service is a service made available from an entity's web server and accessible on the World Wide Web via the Internet.

Visual mapping software on a computer provides a visual mapping interface in which a user can create, edit, and/or view a visual map. Within the visual mapping interface, the visual mapping software provides the user with an option to obtain data from one or more data sources associated with a web service.

In response to the user selecting a data source associated with a web service, the visual mapping software determines whether or not the web service is associated with any user-configurable parameters. If so, the visual mapping software enables the user to enter user-configurable parameters.

After a user has entered any user-configurable parameters, the visual mapping software builds a web service request for the web service associated with the selected data source. The visual mapping application makes a call to the applicable web service with the web service request. The visual mapping application subsequently receives data from the web service and transforms the data into a format that can be used to generate visual map data. The visual mapping software then displays the data in a visual map.

In an alternate embodiment of the invention, the user need not initiate the web service request. In such alternate embodiment, the visual mapping software automatically makes a web service call (for example, upon launch of a visual map) and display the data from the web service in a visual map.

DETAILED DESCRIPTION OF THE PREFERRED EMBODIMENTS

The present invention provides a system, method, and software application for enabling a user to view data from an external data source in a visual map, wherein the external data source has a web services interface.

A web service is a service made available from an entity's web server and accessible on the World Wide Web via the Internet. A web service is a way to obtain data from an entity via a web interface. A computer can make a call to a web service based on the web service's published API (application programming interface). For example, a company with a CRM system may have a web-service interface to the CRM system. This means that the CRM data can be obtained by a program that makes a call to the web service associated with the CRM system.

Figure 2A:
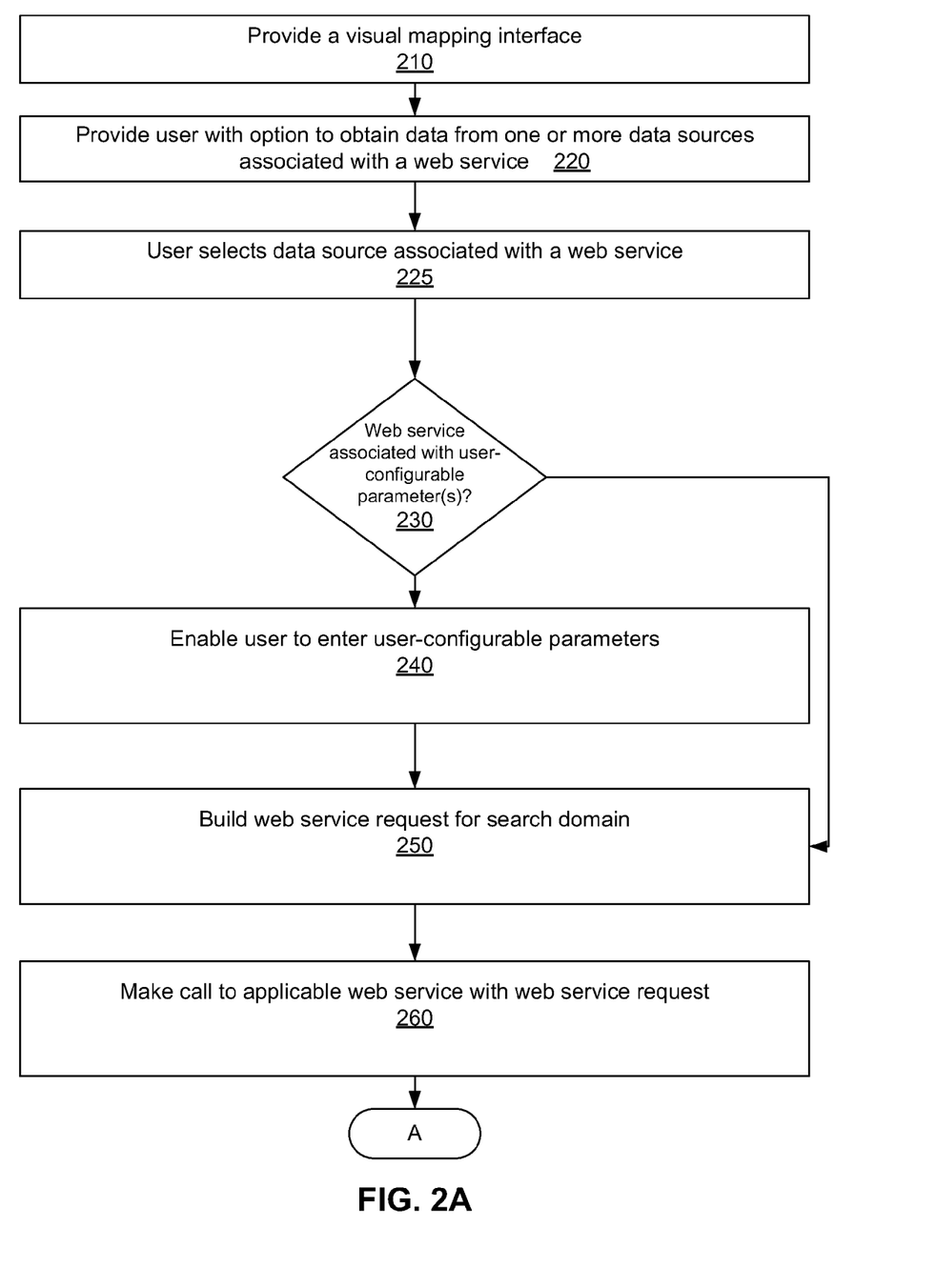
FIGS. 2a-b are a flowchart that illustrates a method, according to one embodiment of the present invention, for enabling a user to view data from a web service in a visual map.
Figure 2B:
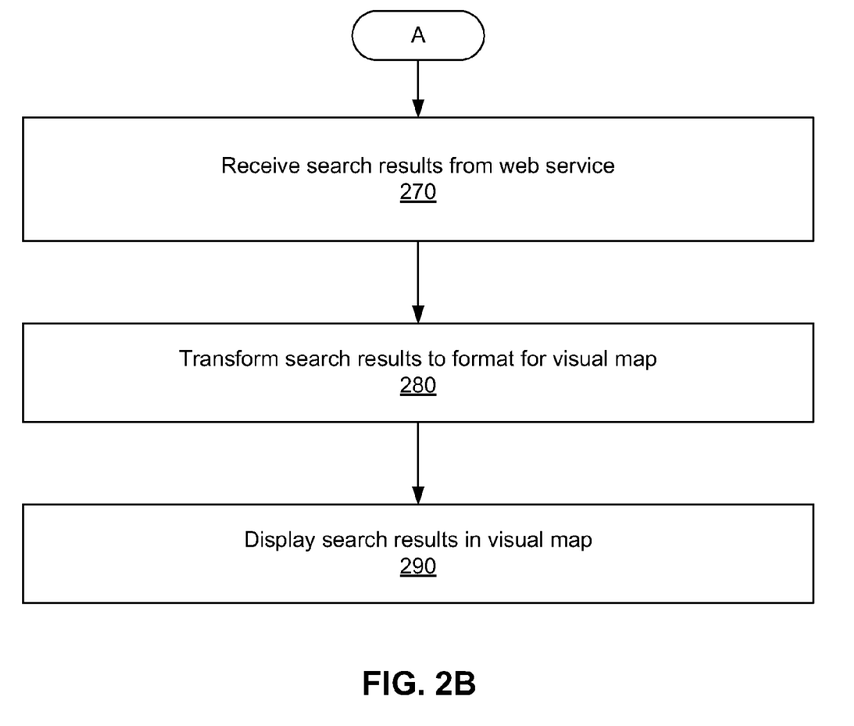

FIG. 2 illustrates a method according to one embodiment of the present invention. The method is implemented by visual mapping software running on a client computer (including, but not limited to, web browser-based applications) or a server computer. As stated above, Mindjet LLC's MIND- MANAGER and MINDJET CONNECT software are examples of visual mapping software.

Referring to FIG. 2, visual mapping software on a computer provides a visual mapping interface in which a user can create, edit, and/or view a visual map (step 210).

Within the visual mapping interface, the visual mapping software provides the user with an option to obtain data from one or more data sources associated with a web service (220). Examples of the type of data that can be obtained from a web service include:

Search results from a search engine (e.g., GOOGLE, YAHOO, MSN)
Stock ticker information
Inventory system data
Human resource information
Data from databases that have a web-service interface There are multiple ways in which a user can initiate a web service request within the visual mapping interface. For example, the visual mapping interface may include icons representing data sources associated with a web service, and a user may click on one of the icons to import data from such data source.

In response to the user selecting a data source associated with a web service (step 225), the visual mapping software determines whether or not the web service is associated with any user-configurable parameters (step 230). If so, the visual mapping software enables the user to enter user-configurable parameters (step 240). In one embodiment, the visual mapping software provides a dialog box or form into which user can enter user-configurable parameters.

After a user has entered any user-configurable parameters, the visual mapping software builds a web service request for the web service associated with the selected data source (step 250). The web service request is built in accordance with the API for the web service. If the user has entered user-configurable parameters for the search, the web service request includes the user-configurable parameters, as well as any default parameters associated with the selected search domain. If there are no user-configurable parameters, then the web service request includes default parameters (if any).

After building a web service request, the visual mapping application makes a call, via the Internet, to the applicable web service with the web service request (step 260). The visual mapping application subsequently receives data from the web service (step 270). The visual mapping software transforms the data obtained from the web service into a format applicable to visual maps (step 280). For example, it is common for web service results to be in the form of XML. In such case, the visual mapping application may perform an XSLT transformation on the received data to transform it into an XML format from which a visual map can be generated. The visual mapping software then displays the data in a visual map (step 290).

In the method of FIG. 2, a user initiates the web service request from a visual mapping interface. However, in an alternate embodiment of the invention, the user need not initiate the web service request. In such alternate embodiment, the visual mapping software automatically makes a web service call (for example, upon launch of a visual map) and display the data from the web service in a visual map.

In one embodiment, when a user selects a data source associated with a web service, the visual mapping software retrieves a web service "definition" for the data source. A web services "definition" specifies (i) the parameters associated with the web service request, (ii) the requirements for building a web service request, and (iii) instructions on how to handle and transform the data returned from the web service request.

Figure 3:
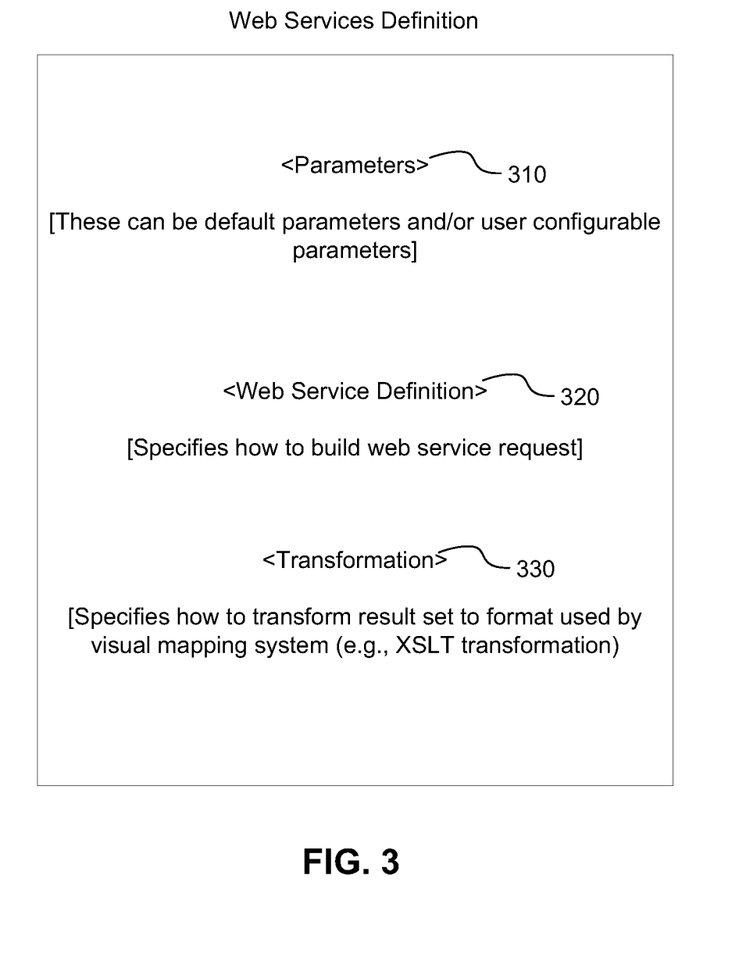
FIG. 3 illustrates an outline of a web service definition.

FIG. 3 illustrates an example outline of a web services definition. The definition includes a Parameters section 310 that specifies any default parameters or user-configured parameters that should be included in a web service request. The Web Service Definition section 320 specifies how to build a web service request for the particular web service associate with the definition. The rules in this section ensure that the web service request is compatible with the API for the web service. The Transformation section 330 specifies how to transform data received from the web service to a data format used by the visual mapping system. In the preferred embodiment, the data from a web services is in XML format, and the transformation is a XSLT transformation that transforms the XML data from the Web Service into an XML format used by the visual mapping software. In one embodiment, a web service definition is an XML file that is compiled into a search map part.

Figure 4A:
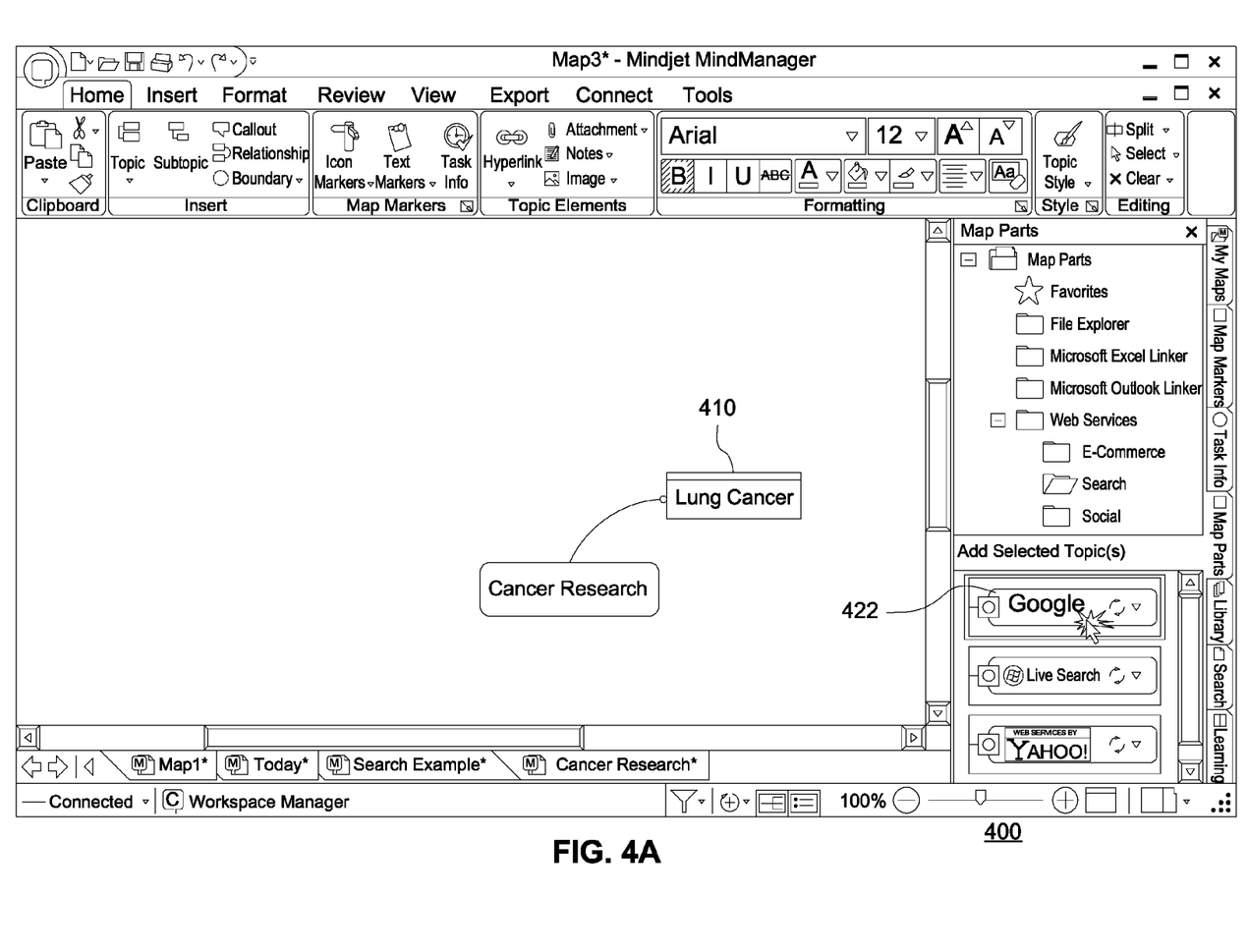
FIGS. 4a-c are screen shots of a visual mapping interface, wherein the screen shots illustrate an example implementation of the present invention
Figure 4B:
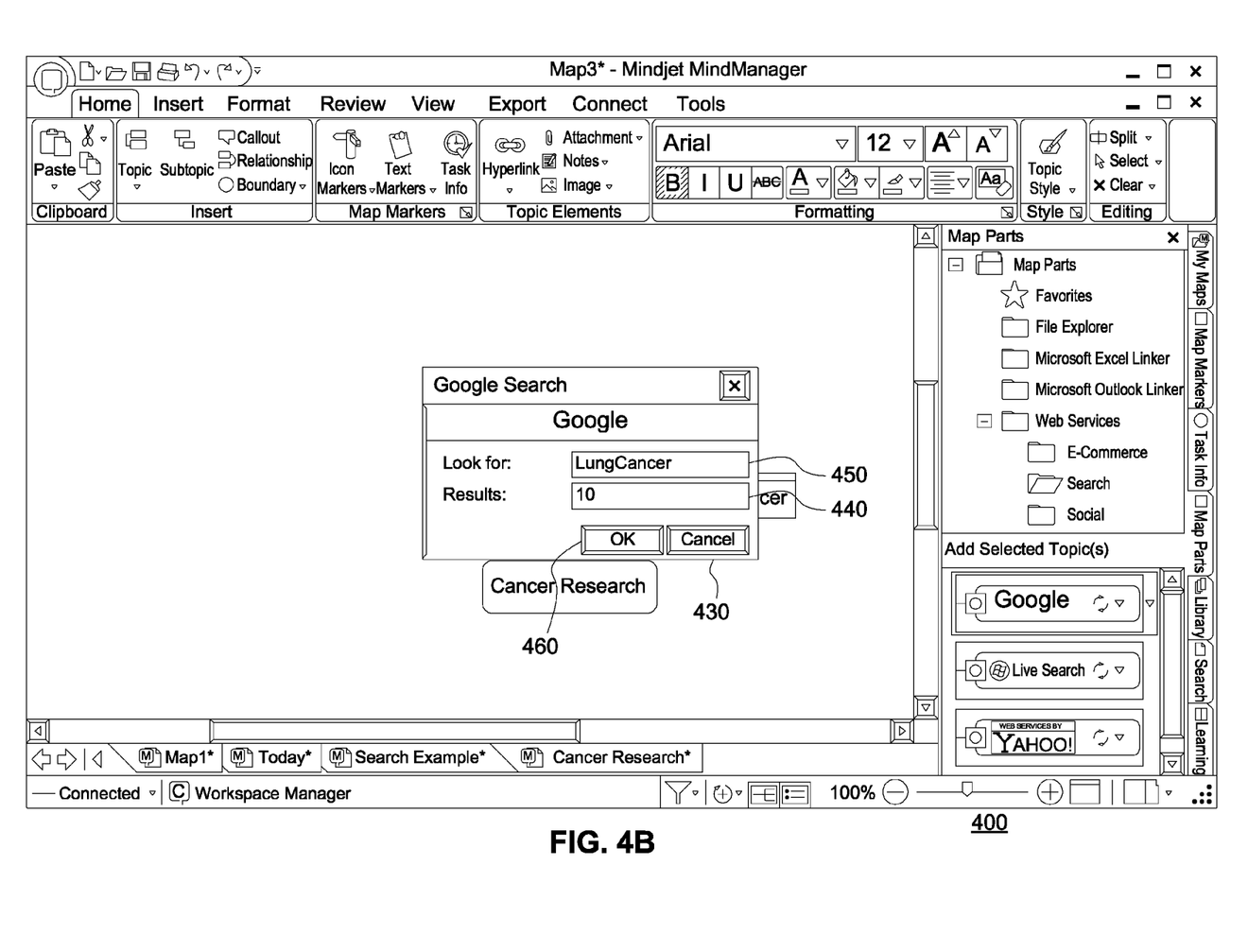
Figure 4C:
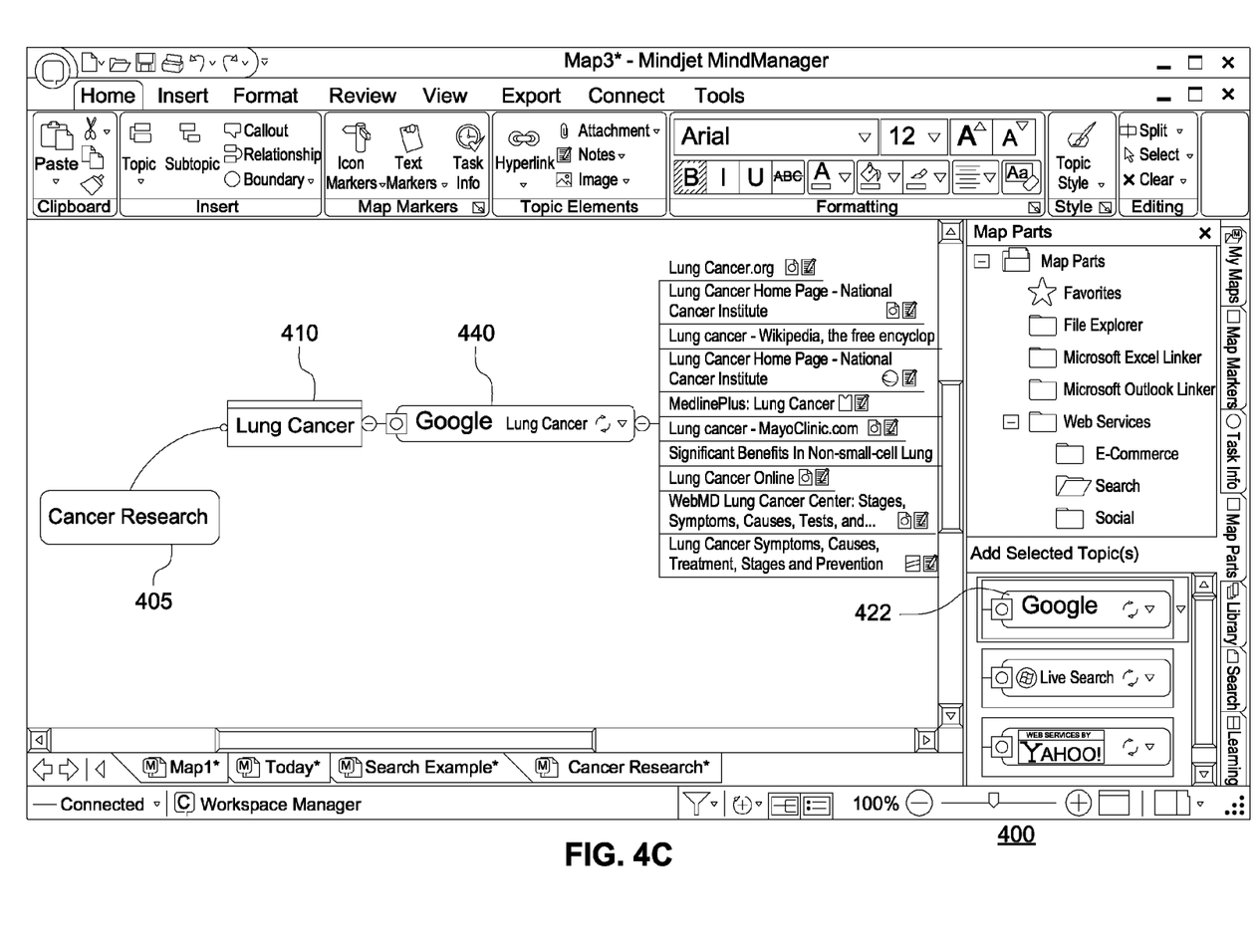

FIGS. 4a-4c illustrate an example implementation of the present invention. In this example, a user has the option to obtain search results from several search engines that have a web services interface, namely GOOGLE, YAHOO, and LIVE SEARCH. Although the web services in this example are associated with search engines, this invention is not limited to search engines. The invention can be used to obtain and view data in a visual map from any data source having a web services interface.

In the present example, the user selects a search domain by either (i) dragging an icon representing a search domain to a topic with search terms or (ii) selecting a topic with search terms and clicking on an icon representing the search domain.

In FIG. 4a, a user has selected topic 410 in visual map interface 400 and clicked on the GOOGLE icon 422 to initiate a GOOGLE search for "Lung Cancer."

In the example of FIGS. 4a-4c, the number of search results displayed is a user-configurable parameter. When a user selects the GOOGLE search domain, a dialog box 430 appears (FIG. 4b). The dialog box 430 includes a "Results" field 440 into which a user can specify the number of search results he/she wants to see in the visual map. A default parameter may initially be displayed in field 440. The dialog box 430 also includes a search terms field 450 (i.e., the "Look for" field). In this example, the default entry for search terms field 450 is "Lung Cancer," as these are the terms entered into topic 410. Dialog box 430 gives the user the opportunity to change the search terms.

After the user selects the "OK" button 460 in dialog box 430, the visual mapping software builds a web services request for GOOGLE, where the request specifies that the search terms are "Lung Cancer" and the number of search results desired is ten. The GOOGLE web service then returns the top ten search results for "Lung Cancer" on the GOOGLE search engine. FIG. 4c illustrates the results from a Google search of "Lung Cancer" displayed in a visual map.

The visual map in FIG. 4c includes a topic 440 that indicates that GOOGLE was the search domain associated with the search results displayed. In this example, topic 440 was added as a subtopic to topic 410 in response to the user selecting GOOGLE as the search domain. Topic 440 is referred to herein as a web services "map part" (the Google icon 422 is also considered a "map part" that became topic 440). By displaying data from a web service as subtopics to a web service map parts in the map, a user viewing the map can see the web service that was used to obtain data. This can be helpful if the user viewing the map was not the user who created the map.

Web service map parts can be added at any level of the map. For example, in FIGS. 4a-4c, a search web services map part can be added as a subtopic to (i) the central topic "Cancer Research" 405, (ii) the "Lung Cancer" topic 410, or (iii) any of the search results displayed in FIG. 4c. In addition, a web services map part can be the central topic of a map. In one embodiment a web services map part is a type of content-specific topic, where one of the properties of the topics is that is able to make a call to a web service (e.g., software code capable of performing the method of FIG. 2 is compiled into the topic). A content-specific topic is designed specifically for a type of content. One implementation of content-specific topics are described in U.S. patent application Ser. No. 11/478,220, titled "System and Method for Providing Content-Specific Topics in a Mind Mapping System," and filed on Jun. 29, 2006, the contents of which are incorporated by reference as if fully described herein.

Figure 5:
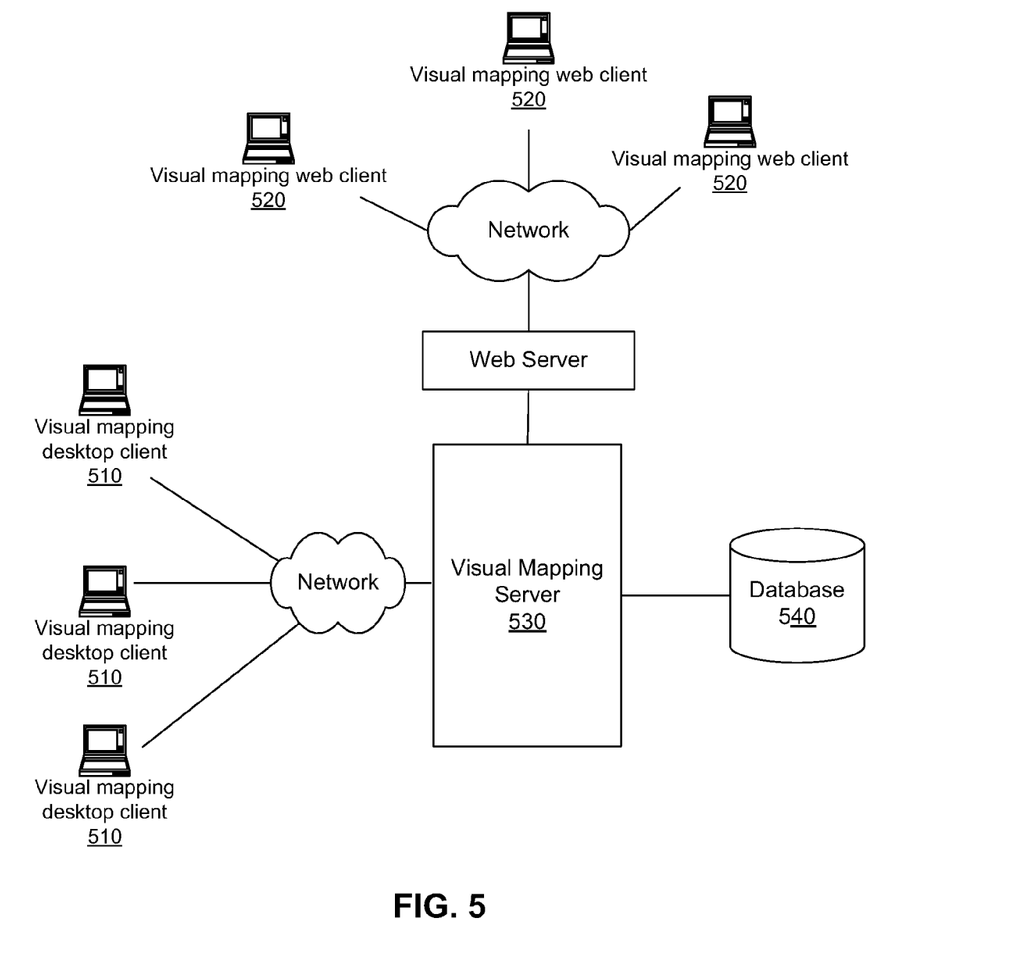
FIG. 5 is a block diagram that illustrates an example of a visual mapping system.

FIG. 5 illustrates an example of a visual mapping system 500 in which the present invention can be implemented. Visual mapping system 500 is only an example, and the invention is not limited to this example.

In system 500, a user can create visual map from a visual mapping desktop client 510 or a visual mapping web client 520. These visual mapping clients 510, 520 are served by a visual mapping server 530. Mindjet LLC's MINDJET CONNECT is an example of a visual mapping server application. After a user creates or edits a visual map, the visual mapping client (510 or 520) sends the map data to the visual mapping server 530, which stores the data in a file system or a database 540. Visual maps with web service data can be saved and shared with other users. In one embodiment, web services data is refreshed when a map with a web services map part is opened (i.e., a web service call is made each time the map is opened).

A visual map can be stored as a file, or the topics in a map can be stored in individually in a database, as described in U.S. patent application Ser. No. 12/001,533 titled "System and Method for Enabling a User to Search and Retrieve Individual Topics in a Visual Mapping System," which was filed on Dec. 12, 2007 and which is incorporated by reference as if fully disclosed herein.

The method of FIG. 2 can be implemented by the visual mapping client (510 or 520) in conjunction with the visual mapping server 530. The method of FIG. 2 can also be implemented by visual mapping software running in an external application, such as the visual mapping software with the network module described in the U.S. patent application titled "System, Method, and Software Application for Enabling a User to View and Interact with a Visual Map in a Non-Visual Mapping Application," filed on Nov. 10, 2008, and having inventors Neil S. Mendelson, William J. Creekbaum, and Andriy O. Mochalskyy, the content of which are incorporated by reference herein.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for enabling a user to view data from an external data source in a visual map, wherein the external data source has a web service interface, the method comprising:
providing, on a computer, a visual mapping interface that enables a user to add to a visual map one or more map parts associated with software code capable of making a call to a web service (a "web service map part"), wherein a user is able to add a web service map part as a topic or a subtopic to a visual map;
building a web service request for the external data source in response to a user initiating the adding of a web service map part to a visual map;
sending the web service request to the web service associated with the external data source;
receiving data from the web service in response to the web service request;
transforming the data into a format that can be used to generate visual map content;
displaying the web service map part in the visual map; and
displaying the data received from the web service in response to the web service request either within the web service map part or as subtopics to the web service map part.

2. The method of claim 1, wherein the data from the web service is received in XML format and an XSLT transformation is applied to the data from the web service to transform the data into another XML format used to generate visual map content.

3. The method of claim 1, wherein the external data source is a Consumer Relationship Management (CRM) system.

4. The method of claim 1, wherein the external data source is a server that provides weather information.

5. The method of claim 1, wherein the external data source is a server that provides stock quote information.

6. The method of claim 1, wherein the external data source is a server that provides human resource information.

7. The method of claim 1, wherein the external data source is a database with a web service interface.

8. The method of claim 1, wherein the external data source is a computer having a web service interface.

9. A method for enabling a user to view data from an external data source in a visual map, wherein the external data source has a web service interface, the method comprising:
providing, on a computer, a visual mapping interface that enables a user to add to a visual map one or more map parts associated with software code capable of making a call to a web service (a "web service map part"), wherein a user is able to add a web service map part as a topic or a subtopic to a visual map;
building a web service request for the external data source in response to a user initiating the adding of a web service map part to a visual map, wherein building a web service request for the external data source comprises:
determining whether or not the web service is associated with any user-configurable parameters,
in response to determining that the web service is associated with one or more user-configurable parameters, enabling the user to enter such user-configurable parameter(s), and
building a web service request that includes any user-configurable parameters and any default parameters for the web service;
sending the web service request to the web service associated with the external data source;
receiving data from the web service in response to the web service request;
transforming the data into a format that can be used to generate visual map content;
displaying the web service map part in the visual map; and
displaying the data received from the web service in response to the web service request, wherein the data is displayed either in the web service map part or as subtopics to the web service map part, and wherein the displayed data conforms to any user-configurable parameters and any default parameters.

10. The method of claim 9, wherein the data from the web service is received in XML format and an XSLT transformation is applied to the data from the web service to transform the data into another XML format used to generate visual map content.

11. The method of claim 9, wherein the external data source is a Consumer Relationship Management (CRM) system.

12. The method of claim 9, wherein the external data source is a server that provides weather information.

13. The method of claim 9, wherein the external data source is a server that provides stock quote information.

14. The method of claim 9, wherein the external data source is a server that provides human resource information.

15. The method of claim 9, wherein the external data source is a database with a web service interface.

16. The method of claim 9, wherein the external data source is a computer having a web service interface.

17. A computer program embodied on a non-transitory computer-readable medium and comprising code, that, when executed by a computer, enables the computer to perform the following method:
    providing, on a computer, a visual mapping interface that enables a user to add to a visual map one or more map parts associated with software code capable of making a call to a web service (a "web service map part"), wherein a user is able to add a web service map part as a topic or a subtopic to a visual map;
    building a web service request for the external data source in response to a user initiating the adding of a web service map part to a visual map;
    sending the web service request to the web service associated with the external data source;
    receiving data from the web service in response to the web service request;
    transforming the data into a format that can be used to generate visual map content;
    displaying the web service map part in the visual map; and
    displaying the data received from the web service in response to the web service request either within the web service map part or as subtopics to the web service map part.

18. The computer program of claim 17, wherein the data from the web service is received in XML format and an XSLT transformation is applied to the data from the web service to transform the data into another XML format used to generate visual map content.

19. The computer program of claim 17, wherein the external data source is a Consumer Relationship Management (CRM) system.

20. The computer program of claim 17, wherein the external data source is a server that provides weather information.

21. The computer program of claim 17, wherein the external data source is a server that provides stock quote information.

22. The computer program of claim 17, wherein the external data source is a server that provides human resource information.

23. The computer program of claim 17, wherein the external data source is a database with a web service interface.

24. The computer program of claim 17, wherein the external data source is a computer having a web service interface.

25. A computer program embodied on a non-transitory computer-readable medium and comprising code, that, when executed by a computer, enables the computer to perform the following method:
    providing, on a computer, a visual mapping interface that enables a user to add to a visual map one or more map parts associated with software code capable of making a call to a web service (a "web service map part"), wherein a user is able to add a web service map part as a topic or a subtopic to a visual map;
    building a web service request for the external data source in response to a user initiating the adding of a web service map part to a visual map, wherein building a web service request for the external data source comprises:
        determining whether or not the web service is associated with any user-configurable parameters,
        in response to determining that the web service is associated with one or more user-configurable parameters, enabling the user to enter such user-configurable parameter(s), and
        building a web service request that includes any user-configurable parameters and any default parameters for the web service;
    sending the web service request to the web service associated with the external data source;
    receiving data from the web service in response to the web service request;
    transforming the data into a format that can be used to generate visual map content;
    displaying the web service map part in the visual map; and
    displaying the data received from the web service in response to the web service request in the visual map, wherein the data is displayed either in the web service map part or as subtopics to the web service map part, and wherein the displayed data conforms to any user configurable and default parameters.

26. The computer program of claim 25, wherein the external data source is a computer having a web service interface.

* * * * *